(12) United States Patent
Weber

(10) Patent No.: US 6,377,903 B1
(45) Date of Patent: Apr. 23, 2002

(54) TEMPERATURE SENSOR

(76) Inventor: Gunther Weber, 4805 Corain Ct., Naples, FL (US) 34114

( * ) Notice: Subject to any disclaimer, the term of this patent is extended or adjusted under 35 U.S.C. 154(b) by 0 days.

(21) Appl. No.: 09/157,320

(22) Filed: Sep. 21, 1998

(51) Int. Cl.[7] .............................................. G05B 13/02
(52) U.S. Cl. ...................... 702/130; 702/131; 702/132; 700/48
(58) Field of Search .................................. 702/130, 131, 702/132; 700/28, 48, 50; 73/772; 72/104

(56) References Cited

U.S. PATENT DOCUMENTS 5,379,950 A * 1/1995 Kuster .......................... 241/30
5,930,136 A * 7/1999 Nakajima et al. ............. 700/48

* cited by examiner

Primary Examiner—Kamini Shah
(74) Attorney, Agent, or Firm—Lawrence E. Laubscher, Jr.

(57) ABSTRACT

A temperature sensor used to control a steel rolling mill includes a housing arranged adjacent to the mill in which a temperature detector is arranged. The detector generates a signal corresponding to a detected temperature. A microprocessor receives the signal and processes it in accordance with a programmed characteristic. The processed signal is delivered to an output switch which produces a control signal for controlling the delivery of roll material to a roller of the rolling mill.

14 Claims, 3 Drawing Sheets

TEMPERATURE SENSOR

BACKGROUND OF THE INVENTION

The invention refers to a temperature-measuring sensor with an electronic circuit to choose the characteristic required by the respective measuring purpose.

Such temperature-measuring sensors are used in a wide range of applications, such as for controlling. Temperature-dependent controls are performed with such temperature-measuring sensors that measure a certain temperature and convert the measured value into a signal, which can be used to operate controls and control loops.

For example, sensors play an important role in the steel industry, where they detect warm roll material. Such devices are used in large numbers in any given rolling mill. Typical tasks of such devices include the initiation of the separation process in extrusion-casting equipment when the desired extrusion length has been reached. Other tasks are controlling scrap scissors and cowls, to name but a few.

While being processed, the roll material to be detected being transported by roller conveyors that heat up over time and may assume temperatures of 300° C. or more. The roll material itself has a temperature of more than 1,000° C. at the beginning of the rolling process, and cools down to less than 250° C. at the end of the rolling train.

The task of the sensors described herein is to detect the warm roll material, but not the background temperature.

In order to make this possible, the sensors described above are manufactured with various response temperatures. One proven concept for these response temperatures is scaled, for example, 250° C., 350° C., 450° C., 650° C. and 800° C.

In this manner, it is possible to choose the device with the right response temperature for every task. Al the beginning of the rolling process, the roll material has a temperature of approx. 1,000° C. A device with a response temperature of 450° C. would properly detect the roll material, but also the background temperature of the roller conveyor, which was heated up by the high temperature of the roll material. A device with a response temperature of 800° C. would be appropriate.

The solution described above—the production of devices with various response temperatures—may work, but would require such a rolling mill to have devices in stock for each of the present response temperatures. In order to reduce excessive stock keeping and to achieve a higher degree of flexibility when deploying such devices, there are devices that allow the user to choose a response temperature. This choice is made possible by making available several response temperatures, which can be selected by a certain configuration of the connection cable or of the connector. With this measure, stock keeping is reduced. However, this solution has a number of grave practical flaws.

Trouble-free operation of these devices is of critical importance to the operation of a rolling mill. For this reason, it must be ensured that the selected response temperature cannot be changed arbitrarily. However, the devices described above are not safe from such change. This is why there is great danger that the selected response temperature is changed by unauthorized persons, which can have grave consequences.

SUMMARY OF THE INVENTION

Therefore, the object of the present invention is to provide a temperature sensor that offers a choice of response temperatures without featuring the disadvantages described above.

According to the invention, this object is accomplished by incorporating a microprocessor or equivalent in the electronic circuit, which allows the characteristic to be programmed.

By contrast to the known embodiments with response temperatures permanently set by the electronic circuit, such embodiment offers significant advantages: the response temperature can be programmed with the aid of appropriate software; i.e., it can be changed at will, within the scope of technical possibilities without having to change the electronic circuit itself. This allows precise adjustment of the response temperature of such devices to the differing requirements of a rolling train to an extent not possible with previously known equipment.

By virtue of the invention described above, which lends itself to continued development corresponding with the progress of microprocessor technology, the current state of the art is advanced by a critical step, and the possibilities of application for these devices are considerably extended by making it possible for them to be programmed to adapt to the intended change.

Another area of application using the same principle is temperature-measuring devices. In such devices, both the temperature range to be measured and the dissolution or scaling of the measured value can be programmed. The devices designed in conjunction with the invention, therefore, are universal devices that may be used to accomplish a wide range of various temperature-measuring tasks, but can also be designed as special devices configured to suit the individual task at hand by virtue of their programmability.

According to a preferred embodiment of the invention, the temperature-measuring sensor is designed as a heat-radiation sensor. The principle embodied by the invention lends itself particularly well to the measuring of heat radiation, because it is installed at a physical distance from the radiating body. The trouble factors that may occur at this physical distance, such as changing current conditions, are best compensated by a temperature-measuring sensor working in accordance with the principle embodied by the invention.

However, according to another embodiment of the invention, the temperature-measuring sensor can also be designed as a heat-conduct sensor, which can compensate changing factors in the area of heat conduct in a favorable fashion.

According to another preferred embodiment of the invention, the electronic circuit is equipped with an output switch that emits a switch signal when the peak value has been reached. This switch signal is used for controlling purposes. For example, mechanic controls can be switched on and off with it.

In another preferred embodiment of the invention, programming of the characteristic is focused on determining and storing a peak value. In this manner, it is possible, for example, to obtain important statistical data about the development of the temperature, which may be used to improve the production process.

According to another preferred embodiment of the invention, programming of the characteristic can be focused on identifying the base value and a value differential exceeding the base value. With the aid of this characteristic, which becomes effective upon appropriate programming of the temperature-measuring sensor, the roll material can be sorted according to the identification of a certain value differential. In this manner, the production quality can be improved.

According to another preferred embodiment of the invention, the output signal can be either binary or measuring, depending on the program selected. By using the appropriate software, the area of application for the temperature-measuring sensor can be expanded significantly and adapted to the task at hand.

According to another preferred embodiment of the invention, the development of the temperature over time can be programmed. In this manner, it is possible to tie the emission of an output signal prompted by a certain measured temperature to the development of the temperature over time.

According to another preferred embodiment of the invention, the software can he adapted to a temperature profile of a certain warm material to be detected. In this manner, it is possible to program the temperature-measuring sensor in such way that it emits an output signal only if a temperature profile measured matches a certain pre-programmed value.

According to another preferred embodiment of the invention, a mean temperature value can be determined over a programmable period of time. Only if the mean value measured in this manner matches a pro-programmed value, the temperature-measuring sensor emits or does not emit, an output signal.

BRIEF DESCRIPTION OF THE FIGURES

More details about the invention may be derived from the comprehensive descriptions below as well as the attached drawings, which illustrate examples of the preferred embodiments of the invention. In the drawings.

FIG. I shows a schematically represented plan view of a rolling train.

DETAILED DESCRIPTION

Figure 1:
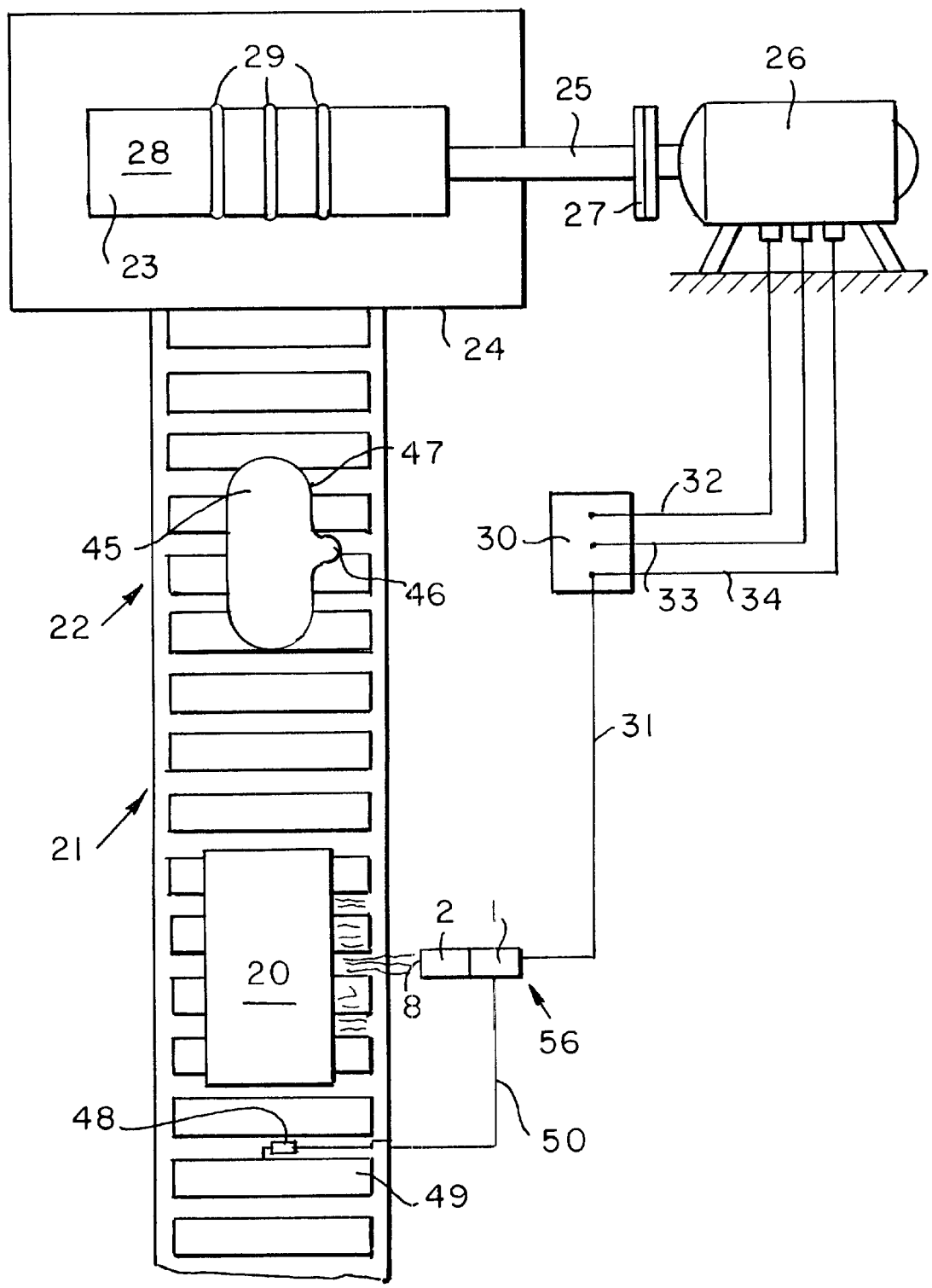
Figure 2:
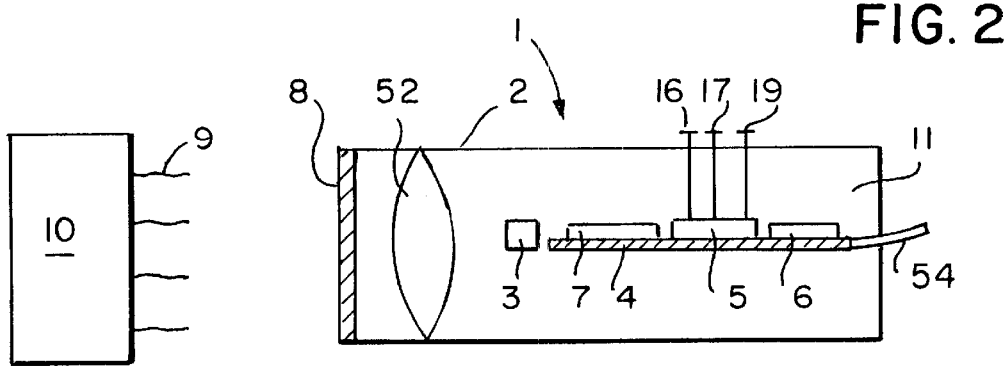
FIG. 2 shows a schematic representation of a longitudinal section of a temperature-measuring sensor.
Figure 3:
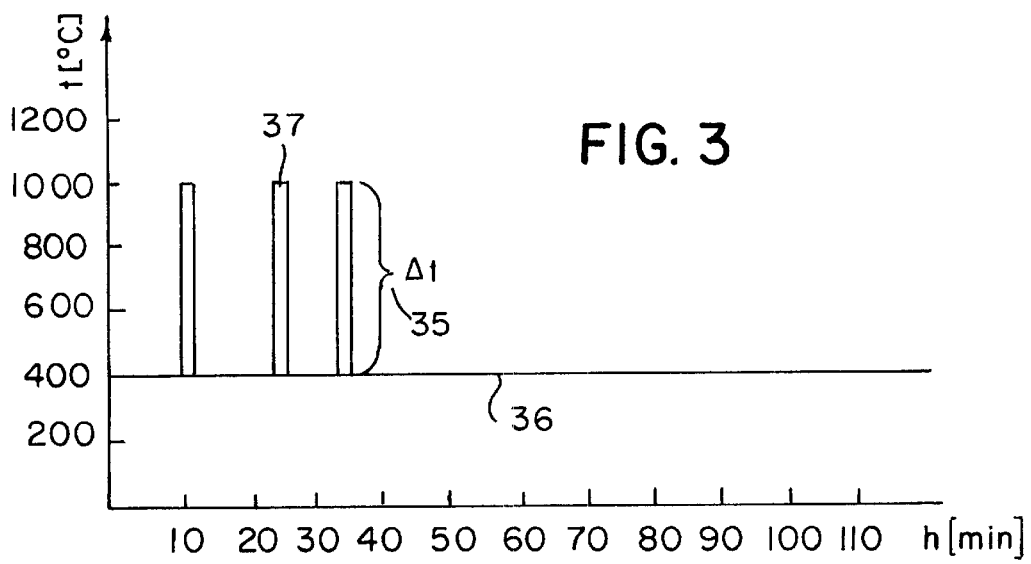
FIG. 3 shows a diagram of a dependency of measured temperatures t of the time h, including the representation of individual peak values.
Figure 4:
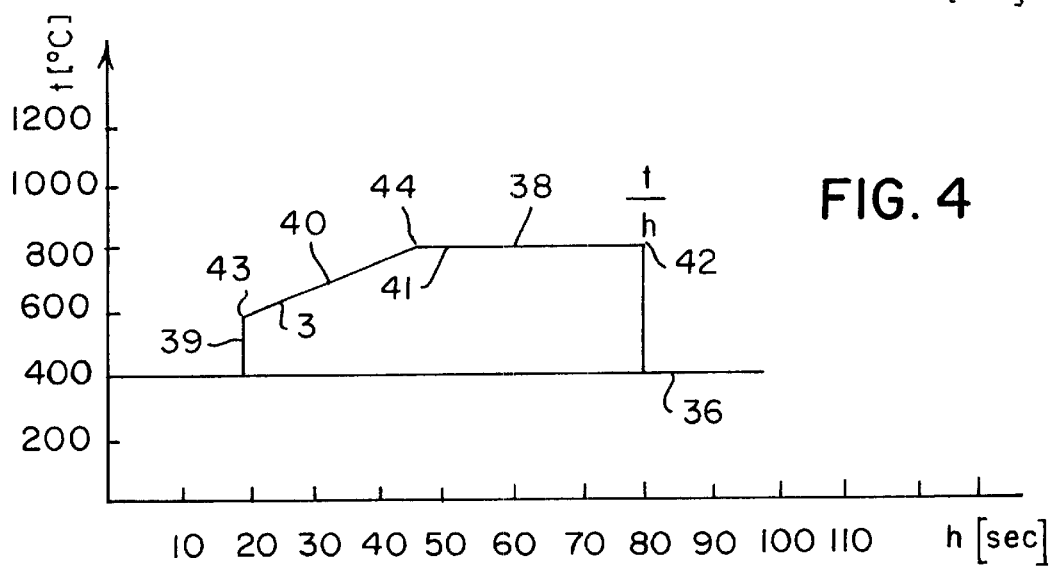
FIG. 4 shows a diagram of the dependency of a temperature t of the time h, which represents a typical temperature profile of conveyed roll material.

A temperature-measuring sensor 1 essentially comprises a housing 2, temperature-measuring elements 3, a switch board 4, a microprocessor 5, and an electric output switch 6. At its end 7 adjacent to the measuring elements 3, the housing 2 is closed off by a heal-permeable plate 8, through which the heat radiation 9 of a heated body 10 can penetrate into an interior space 11 of the measuring sensor 1 enclosed by the housing 2. This heat-permeable plate is usually designed as an optical lens system 52, which directs the heat radiation in the direction of the temperature-measuring element 3. Behind the latter, in the longitudinal direction of the housing 2, the board 4 begins, which has an electric input switch 7 attached to its end facing the measuring element 3. It is followed, in the longitudinal direction of the housing 2, by the microprocessor 5, which is electrically connected to the electric output switch (6) attached to the switch board 4. The electric output switch 6 is equipped with a connection 54, through which a signal exiting the electric output switch 6 is conducted, and to which feed voltage is applied, supplying the individual elements. In this manner, a current is generated at the measuring sensor, matching the radiation concerned. In addition, the feed voltage operates the microprocessor 5.

The current generated in the measuring clement 3 flows via the electric input switch 7 to the microprocessor 5, which is connected to the electric output switch 6 that supplies a signal to the connection 54.

At this connection 54, which protrudes from the housing 3, impulses or measuring results can be obtained, which correspond to the program setting of the microprocessor 5. The latter may have a permanent setting or it may be programmable based on the signal desired at the connection 9. Depending on the type of output signals desired, programming may be performed with the aid of selection switches 16, 17, which are tied to one pre-determined program-setting each. However, it is also conceivable to program the microprocessor 5 with a card selected in each instance, which is inserted into the microprocessor 5 for this purpose. Finally, the microprocessor 5 also comprises a switch 19 providing protection from unauthorized access for example, by means or a switch. This switch 19 is activated to prevent unauthorized parties from reprogramming the microprocessor 5 in a way incompatible with the intended application. Such measuring sensor 1 may also be used to control roll material 20 (FIG. 1), which is conveyed on a roller conveyor of a rolling train 22 in the direction of a roll 23, which revolves in a roll frame 24. This roll 23 is driven via a shaft 25, for example, by an electric motor 26, which is connected to the shaft 25 via a clutch 27. The roll 23 has on its surface 28 a roll profile 29 that could be impressed on the roll material 20.

At a place 29 at a pre-determined distance 29 in the direction of conveyance of the roll material 20 before the roll frame 24, a measuring sensor 1 is placed at a side distance from the roller track 21 in such a manner that the lens system 200 of the measuring sensor 1 faces the roll material. In this manner, the heat radiation emitted by the roll material 20 may enter the housing 2 of the measuring sensor 1, than encounter the measuring element 3, prompting it to generate a current, which is processed in the electric input switch 7 before it enters the microprocessor 5. In this manner, a switch signal corresponding to the present heat radiation occurs in the electric output switch 6. This switch signal is processed in an amplifier 30 connected to the output switch 6 via a line 31 in such way that the switch signals occurring in the amplifier 30 are transmitted via the switch lines 32, 33, 34 to the electric motor 26, which is controlled based on the switch signals received. For example, it is conceivable that, by means of the switch signals received, the electric motor 26 is brought up to a speed that corresponds to the temperature of the roll material.

In the process, the microprocessor 5 generates switch signals based on the way it was programmed. The programming is performed given consideration to both the temperature of the roll material 20 and the background temperature of the roller track 21. The latter absorbs a part of the heat emitted by the roll material 20 and reaches the background temperature in the process. The programming of the microprocessor 5 is conducted in such a manner that the heat radiation emitted from the roller track 21, which equals the base temperature of the roller track 21, does not generate a switch signal at the output switch 6. Not until the roll material 20, with its disproportionately higher temperature, suitable for its transformation, has reached the area of the measuring sensor 1, does the heat radiation measured by the measuring element 3 increase so dramatically that the measuring sensor 1 emits a switch signal to the output switch 6.

The microprocessor 5 is programmed in such a manner that it emits the switch signal once it has determined a temperature differential 35 between the base temperature 36 of the roller track 21 and the peak temperature 37, which matches the temperature of the roll material 20. However, it is also possible that the switch signal at the output switch 6 occurs when the peak temperature 37 is reached, unaffected by the base temperature 36. Finally, it is also conceivable that the microprocessor 5 is impressed with a characteristic that prompts a switch signal at the output switch 6 when a predetermined ratio of base value 36 and peak value 37 is reached and/or exceeded. Which one of the two represented possibilities of selecting a characteristic is chosen, depends on the task at hand, the accomplishment of which is aided by the switch signal emitted by the output switch 6.

Finally, it is also conceivable that the microprocessor 5 is impressed with a characteristic that is dependent on time. Here, the microprocessor 5 is provided with a time-dependent temperature curve 38. Once this temperature curve 38 is detected by the measuring sensor 1, a switch signal occurs at the output switch 6 to control, for example, the electric motor 26 or other functions required for the processing of the roll material 20.

The temperature curve 38 may be provided, by example, in that the roll material 20 emits radiation during the approximation stage 39, which makes the temperature recorded by the measuring sensor 1 rise from the base temperature 36 by 200° C. to 600° C. At a roll temperature considerably higher than the temperature of the roller track 21, the roil material 20 then increasingly moves into the area of the measuring sensor 1, so that the temperature recorded by the latter quickly rises in an arrival stage 40 from the approximate temperature 6 to the temperature of 800° C. of the roll material 20. The value recorded by the measuring sensor 1 remains at this temperature during a run stage 41, until the roll material 20 finally exits the reception range of the sensor 1 at an end stage 42. Regardless of whether the temperature of the roll material 20 conveyed out of the range of the sensor 1, and influencing the latter, drops more or less slowly, the curve development up until the final point 42 already suffices as a characteristic entered into the microprocessor 5 with the aid of the software. This characteristic is not only distinguished by the peak value represented by the roll material 20, but also by the scales 43, 44 at the beginning and the end of the arrival stage 40.

Finally, programming of the microprocessor 5 can also be conducted in such a manner that a point is fixated within a selected temperature range and used as a characteristic for triggering a switch signal.

Programming of the microprocessor 5 can also be conducted in such a manner that the base value 36 is variable. Such application is in effect, for example, when—using the example of the rolling train—the temperature of the rolling train 22 rises due to conveyance of a charge of high-temperature roll material 20 on the roller track 21. In these cases, the base temperature 36 can be felt, for example, by a temperature feeler gauge 48, which feels the temperature at a representative location of the roller track 21, for example, at a roll 49 in close proximity of the measuring sensor 1. The current exiting the temperature feeler gauge 48 is conducted via an access line (50) to the microprocessor 5, which then effects a connection of the base temperature 36. Upon completion of this correction, the program entered into the microprocessor 5 determines whether, under the same conditions, the rolling process for the roll material 20 is continued, changed or even suspended until the base temperature 36 is increased.

Depending on the possibilities available, programming of the microprocessor 5 can also be effected with the aid of a programming device that is permanently or temporarily connected to the microprocessor 5. A non-represented computer, which can be linked to the computer by cable, may also be considered as a programming device.

The microprocessor 5 can be programmed in such a manner that it emits either a binary or an analog signal. If it is programmed to emit a binary signal, it may be either closing or opening. The switch temperature prompting the binary output signal may be selected and programmed with the aid of software. Moreover, the range of the operating temperature to be measured could be selectable and software-programmable. Moreover, both the range of the operating temperature and the response temperature could he programmable if a binary signal is emitted. Finally, the drop temperature can also be programmable by software.

Time-dependent characteristics of a certain temperature development, too, can be programmed. In this maimer, the software can be adapted to the temperature profile of a certain warm material to be detected. The mean temperature can be determined over a programmable period of time in the same manner. Finally, a combination is conceivable that allows programming the output signal based both on the temperature level and the duration of the temperature's effect. Finally, the program determining temperature measuring can be based on other measuring values, which are fed into the microprocessor 5 from outside.

Finally, the microprocessor 5 can be programmed in such a manner that it is fed from outside with certain program components or pre-determined values, which in turn depend on, or are determined by, other measuring values or factors of the production process.

Moreover, it is possible that the sensor 5 is equipped with a bus port. Increasingly, manufacturing facilities are equipped with a bus circuit connecting all sensors to each other, in order to enable easy and effective communication between the sensors and the actors of a machine, on one hand, and the computer controlling the process, on the other. Because the sensor is equipped with a microprocessor 5 or an equivalent programmable unit, a bus circuit may be implemented with particular ease. This is of great importance as various bus protocols are available on the market and a programmable microprocessor 5 can be adapted to the different systems with the aid of software. This adaptation would not be possible without a microprocessor due to a lack of suitable hardware.

Moreover, the microprocessor may be programmed in such a manner that it does not react to predetermined temperatures of the material to be detected, but to "radiation noise" of this material. This noise results from the fact that the emitter's surface is not entirely homogeneous, which means that the emission of radiation varies from point to point if the monitored surface chosen is sufficiently small. These variations in emission cause radiation noise that can be identified in terms of quality. In this manner, it is possible by means of an appropriate algorithm to identify detectable warm material based on its noise. This noise distinguishes the material to be detected from a constant background temperature, which does not emit any noise. By picking up and analyzing the noise, warm material is detected even if the temperature of the background radiation is higher than that of the material to be detected.

Figure 5:
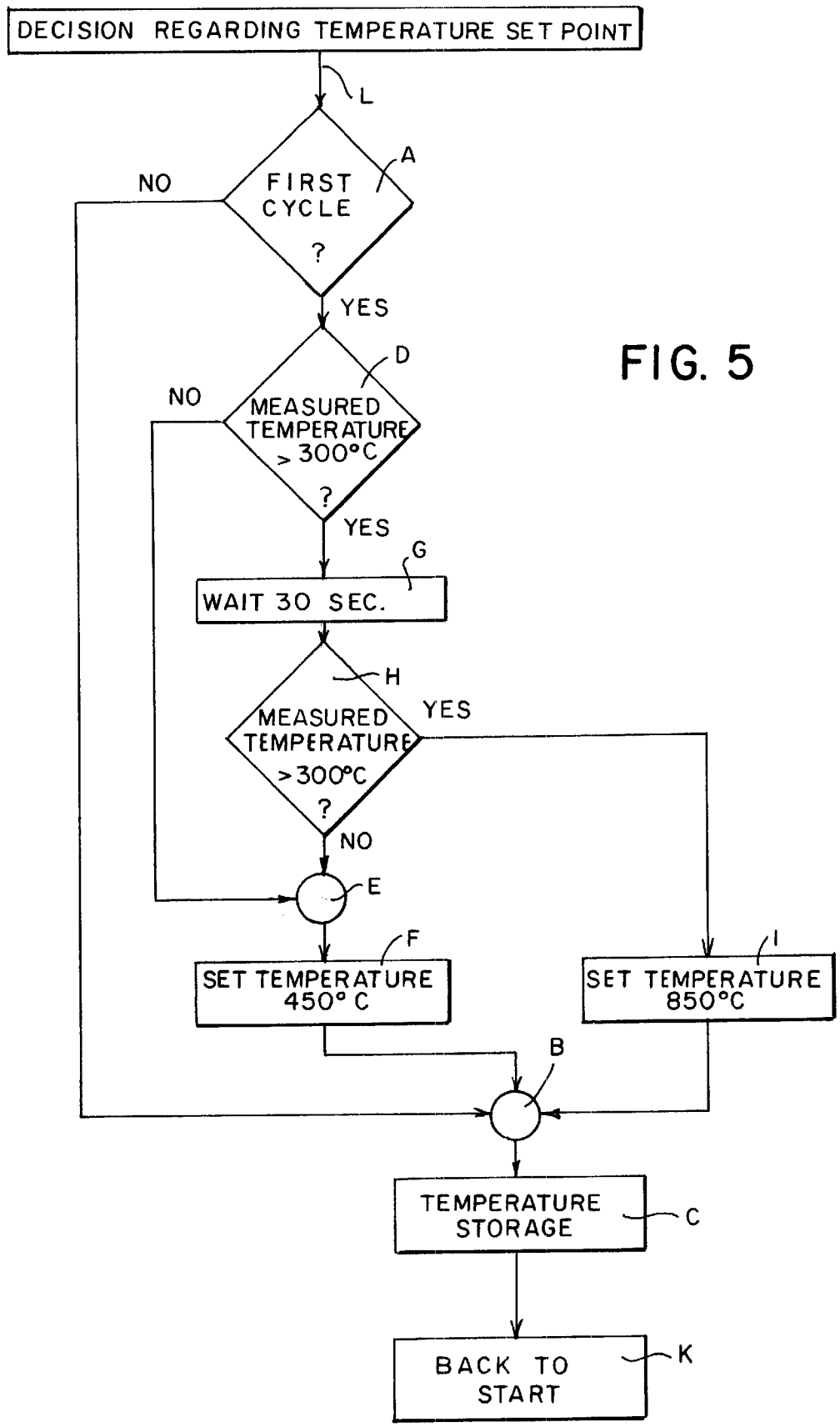
FIG. 5 shows a representation of a typical flow diagram for the decision about a temperature setting.

The following example illustrates a possible application of the temperature-measuring sensor as embodied by the invention. In a rolling-mill environment, one is faced with the task of programming the temperature-measuring sensor in such a manner that it alleniatively selects its response temperature autonomously. With the temperature of the roll material at approx. 1000° C., the construction transporting the roll material heats up to more than 300° C. In such case, a response temperature of 800° C. should be chosen. If, however, the temperature of the roll material is so much lower, so that the temperature of the construction components fall below 300° C., the response temperature should be set to 450° C. The algorithm shown in FIG. 5 illustrates the method used by the proposed software to accomplish this task.

A first decision (A) is to determine whether the temperature-measuring sensor was switched on very recently or some time ago. If it was switched on very recently, the measuring result it produced is not yet reliable. Via the "No" string, the input control (A) switches to a juncture (B), to which a temperature memory (C) is attached.

If it turns out that the temperature-measuring sensor was switched on some time ago and has reached its operating condition, the level of the temperature measured is determined (D) via the "yes" string. If the temperature of 300° C. is not reached, a juncture (B) is made for immediately afterward, which is located directly at the access to the response temperature of 450° C. (F). From there, the juncture (B) is made for, which is linked to the temperature memory (C), where the response temperature is saved.

If it turns out during the process of determining the temperature level (D) that the temperature measured is higher than 300° C., there is the possibility that the temperature-measuring sensor either detects warm roll material 45, the temperature of which is considerably higher than 300° C., or construction components that were heated to more than 300° C. by the hot roll material 45. If the temperature-measuring sensor has detected roll material 45 with a temperature significantly higher than 300° C., it stores this temperature for only a relatively brief period of time (30 sec.) until the roll material is conveyed out of the range of the temperature sensor 1. Whether or not a decision needs to be made in favor of the response temperature of 450° C. or of 850° C., depends on the length of time, during which the temperature sensor 1 measures a temperature of more than 300° C. This is why temperature measuring is suspended for a pre-determined period of time of 30 seconds (G) before a decision is made. If the temperature is still more than 300° C. after 30 seconds, a response temperature of 850° C. (I) is made for as part of a decision-making step (H). If, after 30 seconds, the temperature in the decision field (H) drops again to 300° C. or below, the response temperature of 450° C. is made for via the juncture (E).

Following the saving of the temperature value concerned in the temperature memory (C), the temperature-measuring sensor 1, as part of a switching step (K), switches back to an output (L). the temperature-measuring sensor is now available for performing a new measuring and decision-making task.

What is claimed is:

1. A temperature sensor used in controlling the operation of a rolling mill, comprising
   (a) a housing arranged at a predetermined location relative to the rolling mill;
   (b) means arranged within said housing for measuring a temperature and for generating a signal corresponding with said temperature;
   (c) programming means arranged within said housing and connected with said temperature measuring means for processing said signal in accordance with at least one temperature characteristic; and
   (d) an output switch arranged within said housing and connected with said programming means for producing a control signal for the rolling mill when said temperature characteristic is detected in order to control the delivery of roll material to a rolling device.

2. A temperature sensor as defined in claim 1, wherein said characteristic comprises a peak temperature of the roll material, said output switch producing said control signal when said peak temperature is detected.

3. A temperature sensor as defined in claim 2, wherein said characteristic further comprises a temperature differential between a base temperature of the rolling mill and said peak temperature.

4. A temperature sensor as defined in claim 3, wherein said base temperature is adjustable.

5. A temperature sensor as defined in claim 3, wherein said characteristic comprises a ratio between said base and peak temperatures.

6. A temperature sensor as defined in claim 3, wherein said temperature measuring means operates within a predetermined temperature range comprising a plurality of temperature sectors.

7. A temperature sensor as defined in claim 3, wherein said programming means includes a memory portion for storing maximum and minimum temperatures.

8. A temperature sensor as defined in claim 3, wherein said control signal is a binary or analog signal.

9. A temperature sensor as defined in claim 1, wherein said temperature measuring means is a heat radiant sensor.

10. A temperature sensor as defined in claim 1, wherein said temperature measuring means is a heat conducting sensor.

11. A temperature sensor used in controlling the operation of a rolling mill, comprising
    (a) a housing arranged at a predetermined location relative to the rolling mill;
    (b) means arranged within said housing for measuring a temperature and for generating a signal corresponding with said temperature;
    (c) programming means connected with said temperature measuring means for processing said signal in accordance with at least one characteristic comprising a peak temperature of the roll material and a temperature differential between a base temperature of the rolling mill and said peak temperature, said programming means being programmed via password-protected software for selecting said characteristic; and
    (d) an output switch connected with said programming means for producing a binary or analog control signal for the rolling mill when said characteristic is detected in order to control the delivery of roll material to a rolling device.

12. A temperature sensor as defined in claim 11, wherein said programming means programs a characteristic temperature profile over time.

13. A temperature sensor as defined in claim 12, wherein said programming means determines a mean temperature value.

14. A temperature sensor as defined in claim 12, wherein said control signal is a function of a temperature measurement over time.

* * * * *